UNITED STATES PATENT OFFICE.

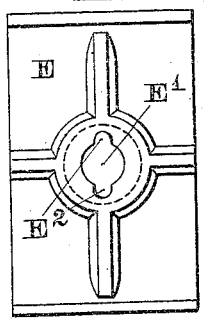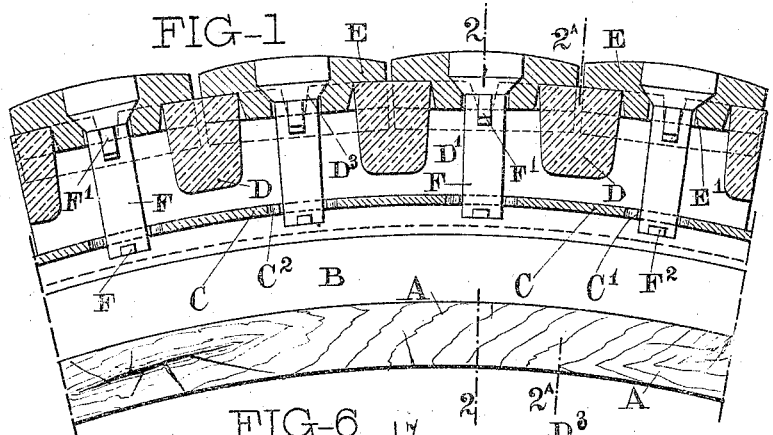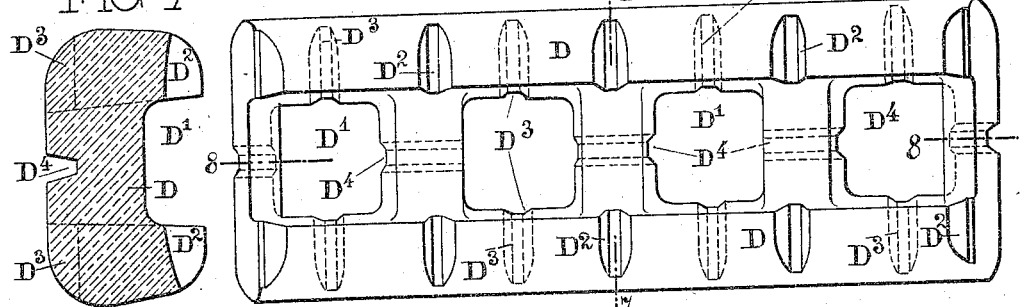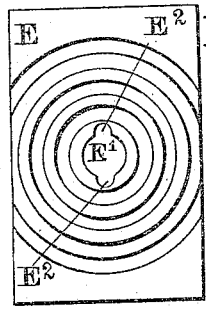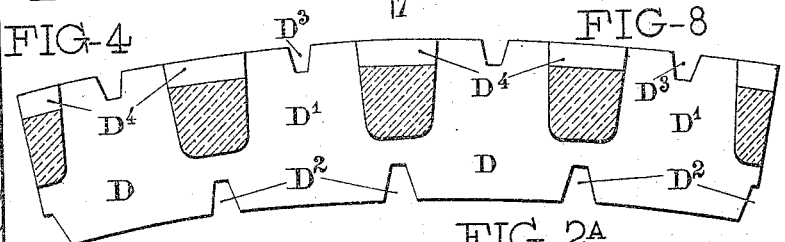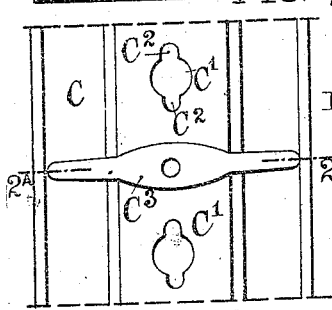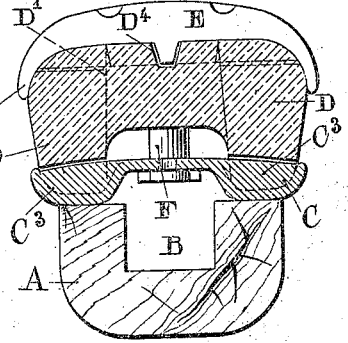

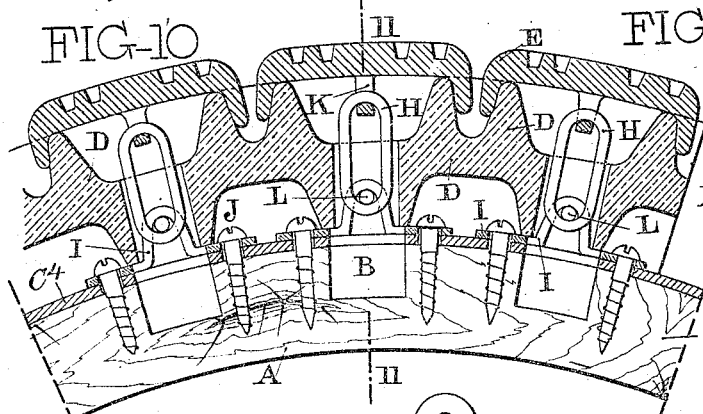
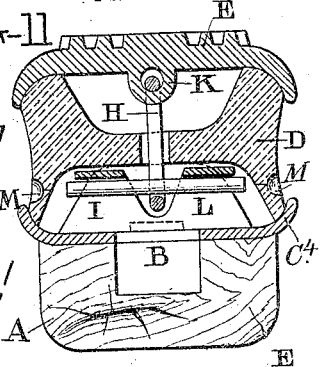
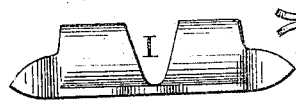
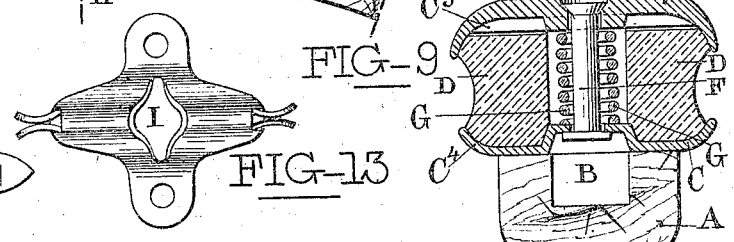
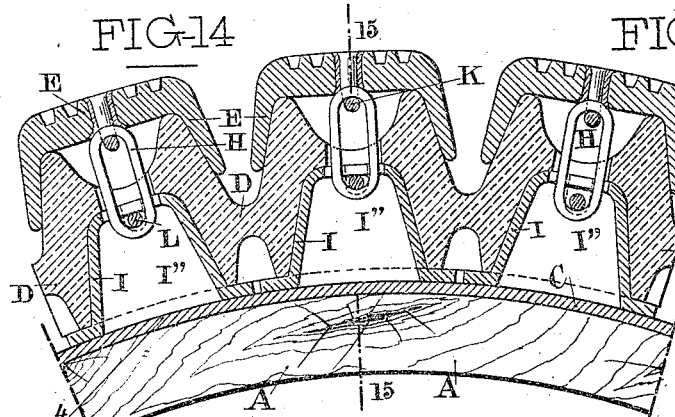
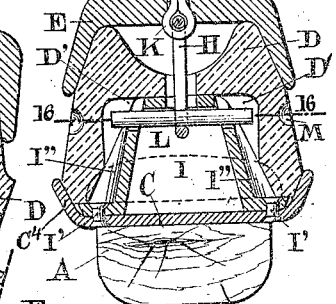
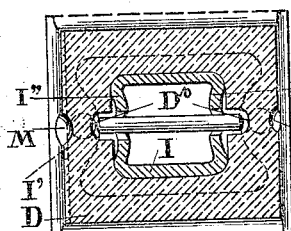
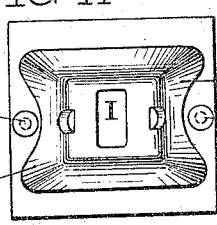
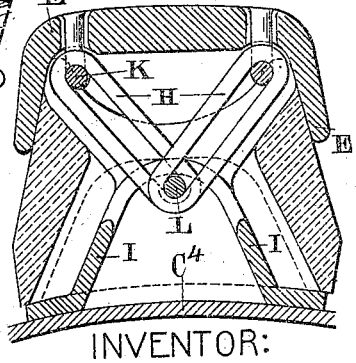

ANTOINE BONNAZ, OF LYON, FRANCE.

ELASTIC TIRE.

942,881. Specification of Letters Patent. Patented Dec. 14, 1909.

Application filed January 17, 1908. Serial No. 411,290.

*To all whom it may concern:*

Be it known that I, ANTOINE BONNAZ, a citizen of the French Republic, residing at Lyon, France, have invented a certain new and useful Improvement in Elastic Tires, of which the following is a specification.

The elastic tire which forms the subject of the present invention is formed by the juxtaposition of flexible elements mounted on a rim. These elements, which are movable independently of each other, are capable of yielding to pressure in the same way as a pneumatic tire, but on the other hand they are not capable of indentation, though possessing great elasticity.

In the annexed drawings Figure 1 is a section of a portion of the rim with a few of the elements which constitute the tire. Fig. 2 is a section on the line 2—2 of Fig. 1. Fig. $2^a$ is a section on line $2^a$—$2^a$ of Fig. 1. Fig. 3 is a plan view of the inside of the metallic elements which form the tread, and Fig. 4 is a plan view of the outside thereof. Fig. 5 is a plan view of part of the rim applied to the ordinary wooden felly. Fig. 6 is a plan view of the rubber supports which give the tire elasticity. Fig. 7 is a section on the line 7—7 of Fig. 6, and Fig. 8 a section on the line 8—8 of Fig. 6. Fig. 9 is a section illustrating a modification of the tire, comprising, in addition to india-rubber, springs which allow of reducing the thickness of india-rubber used. Fig. 10 is a section of a portion of a wheel, illustrating a modification of the invention, and Fig. 11 is a section on the line 11—11 of Fig. 10. Figs. 12 and 13 are detail views, in elevation, and plan, of the supports of the tire-elements in this modification. Fig. 14 is a longitudinal section of a portion of a wheel, illustrating another form of construction. Fig. 15 is a section on the line 15—15 of Fig. 14, and Fig. 16 is a section on the line 16—16 of Fig. 15. Fig. 17 is a plan view of a plate used in this construction. Fig. 18 is a cross-section illustrating another modification.

The wooden felly A has at its periphery a circular groove B, and a metal rim C placed on the felly has at intervals holes $C^1$ provided with enlargements $C^2$ in the longitudinal direction. The edges and central part of the metal rim are raised so that between them seats are formed for an india-rubber cushion D made in one piece or consisting of segments placed end to end. This cushion constitutes the elastic element of the tire. For joining the cushion to the rim C the latter has at intervals projections $C^3$ which enter recesses $D^2$ formed in the cushion. The latter also has perforations $D^1$ extending through it, and recesses $D^3$ in the surface opposite that in which the recesses $D^2$ are made. The perforations $D^1$ serve for the passage of the fastenings by which the metal elements E which constitute the tread are secured to the rim C. A longitudinal channel $D^4$ extends around the outer circumference of the cushion (Figs. 6, 7 and 8).

The outer surfaces of the metallic elements E placed on the rubber cushion are striated or ribbed to prevent slipping. Each of the elements E has a central hole $E^1$ with lateral enlargements $E^2$, this hole being traversed by a bolt F which connects the element to the rim C. Ribs or projections $F^1$ and $F^2$ formed on the shank of the bolt are adapted to pass through the enlargements $E^2$ and $C^2$ of the holes E and C respectively. By turning the bolt through 90 degrees the element E is locked to the rim C.

To allow of using a thinner rubber cushion D, a number of springs G may be provided, to assist in imparting elasticity to the tire. These springs are preferably helical springs surrounding the shanks of the bolts F, as shown in Fig. 9.

In the construction shown in Figs. 10 to 13, the raised central portion of the rim is formed as follows, the rim $C^4$ is provided at intervals with holes B for the passage of rings or links H, the purpose of which will be described hereinafter. Bent plates I (Figs. 12 and 13) are fastened over the holes B by means of screws J which engage the felly after passing through the rim $C^4$ and lugs with which the plates I are provided. The said plates I in conjunction with the perforated rim $C^4$ constitute a centrally raised rim.

Elasticity is imparted to the tire by flexible elements D of india-rubber, cork or other compressible matter. These elements D have internal and external cavities, and the metallic elements E forming the tread are placed on the compressible elements D. Each metallic element E has an eye K engaged by one of the links H, and the latter is connected by a pin L to the plate I to which it belongs. To enable the pins L to be easily inserted the flexible elements D have small recesses M opposite the places which the pins are to occupy, and these recesses enable repairs to be carried out. The walls behind these can easily be perforated with the aid of a knife or the like, and the pins can then be inserted or removed. The elasticity of the material causes the holes made to close up and become invisible after use.

It is obvious that the cavities with which the elements D are provided enable the same to yield to concussion. The links H connecting the tread elements E to the rim give freedom of movement and do not interfere with the yielding of the elastic elements.

In the construction shown in Figs. 14 to 17 the flexible elements D are mounted in the same manner, but the eyes K are brazed to the metallic elements E instead of being integral therewith.

The plates I which constitute the central raised portions of the rim $C^4$ are fixed to the rim $C^4$ by small rivets $I^1$ which engage perforated lugs with which the plates are provided. The lateral walls $I''$ of the plates are slightly curved as shown in Fig. 17, to enable the rivets $I^1$ to be placed. The flexible elements D have recesses $D^{10}$ to give them greater freedom of movement and to prevent friction with the pins L.

The construction shown in Fig. 18, which is more particularly designed for carrying heavy loads, has two links H for each tread-element E, and two attachments for connecting the links to the elements E, but is otherwise similar to the construction shown in Figs. 14 to 17.

What I claim as my invention and desire to secure by Letters Patent of the United States is:—

In an elastic tire the combination of a channeled rim raised and perforated at its center, an elastic cushion having bearing on said rim laterally of the central portion thereof, a plurality of metal elements bearing on the outside of said cushion, and metallic connecting pieces severally connecting the metal elements with the central portion of the channeled rim, said connecting pieces traversing the perforated portion of the rim and having sliding movement with respect thereto.

In witness whereof I have signed this specification in the presence of two witnesses.

ANTOINE BONNAZ.

Witnesses:
 JEAN GERMAIN,
 GUILLAUME PIOCHE.